United States Patent [19]
Kaneko

[11] Patent Number: 4,769,725
[45] Date of Patent: Sep. 6, 1988

[54] SERVO HEAD POSITIONER USING VCO AND COUNTER FOR DIGITIZING POSITION INFORMATION

[75] Inventor: Toru Kaneko, Miyagi, Japan

[73] Assignee: Alps Electric Co., Ltd., Japan

[21] Appl. No.: 895,184

[22] Filed: Aug. 11, 1986

[30] Foreign Application Priority Data

Aug. 10, 1985 [JP] Japan ................................ 60-176285

[51] Int. Cl.[4] ........................ G11B 5/596; G11B 21/10

[52] U.S. Cl. ........................................ 360/77; 318/696

[58] Field of Search ............................. 360/77, 78, 70; 318/561, 685; 340/347 AD; 364/174; 324/120

[56] References Cited

U.S. PATENT DOCUMENTS

| | | | |
|---|---|---|---|
| 3,201,781 | 8/1965 | Holland | 324/120 |
| 3,868,677 | 2/1975 | Kidd | 340/347 AD |
| 4,297,734 | 10/1981 | Laishley et al. | 360/77 |
| 4,414,586 | 11/1983 | Hirota et al. | 360/70 |
| 4,462,053 | 7/1984 | Lum et al. | 360/78 |
| 4,488,187 | 12/1984 | Alaimo | 360/77 |
| 4,498,129 | 2/1985 | Velazquez | 364/174 |
| 4,516,162 | 5/1985 | West | 360/77 |
| 4,542,428 | 9/1985 | Yauagi | 360/77 |
| 4,586,094 | 4/1986 | Chambors | 360/77 |

OTHER PUBLICATIONS

*Electronic Analog/Digital Conversions*, Hermann Schmid, Van Nostrand Reinhold Company, p. 292.

*Primary Examiner*—Raymond F. Cardillo
*Assistant Examiner*—David L. Robertson
*Attorney, Agent, or Firm*—Guy W. Shoup; Paul J. Winters; Gerald F. Dunne

[57] ABSTRACT

A servo control apparatus which can accurately control the head with a simplified structure has a voltage controlled oscillator which is controlled in accordance with servo information stored in a servo data region of the disk, and a reversible counter which counts an output signal of the voltage controlled oscillator to convert it to a digital signal corresponding to the amount of deviation of the head from a target track. The digital signal is used for position control for accurate positioning of the head.

2 Claims, 3 Drawing Sheets

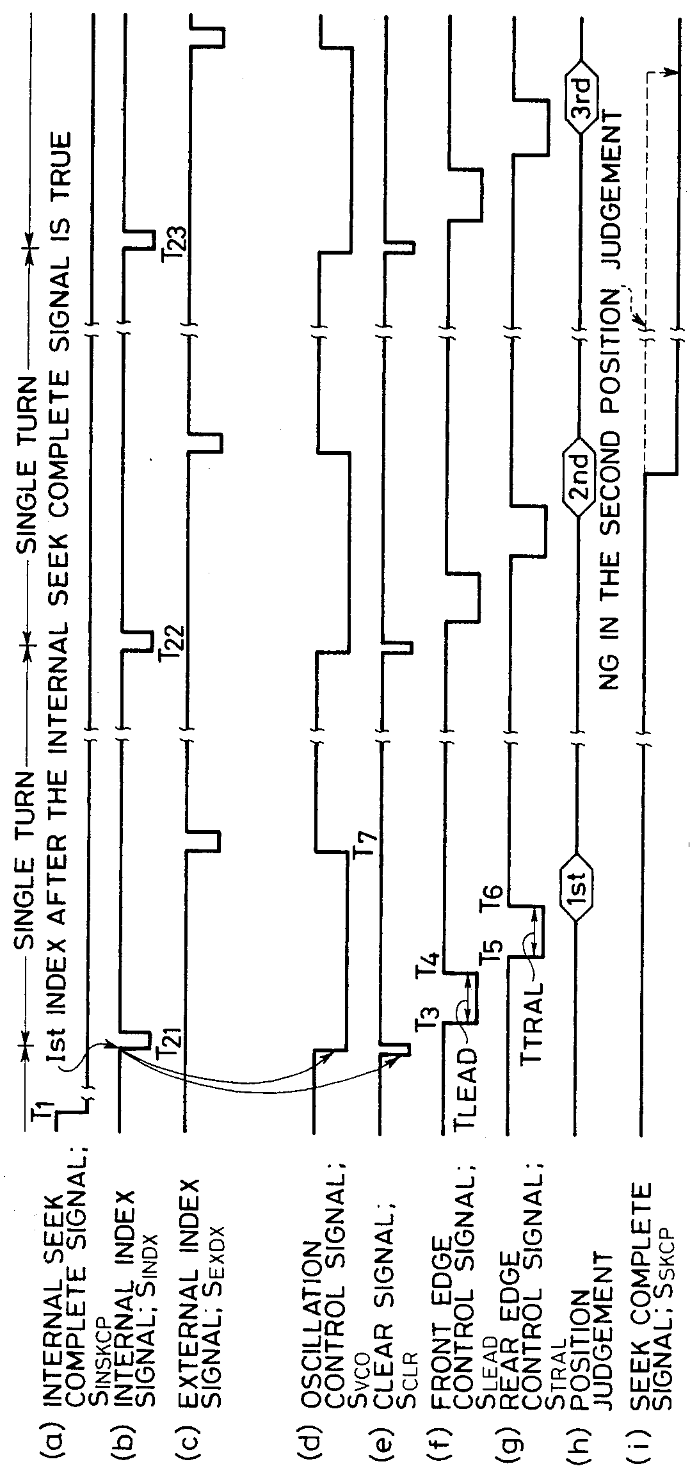
FIG. 2
SINGLE TURN
SINGLE TURN
SINGLE TURN
1st INDEX AFTER THE INTERNAL SEEK COMPLETE SIGNAL IS TRUE
(a) INTERNAL SEEK COMPLETE SIGNAL; SINSKCP
(b) INTERNAL INDEX SIGNAL; SINDX
(c) EXTERNAL INDEX SIGNAL; SEXDX
(d) OSCILLATION CONTROL SIGNAL; SVCO
(e) CLEAR SIGNAL; SCLR
(f) FRONT EDGE CONTROL SIGNAL; SLEAD
(g) REAR EDGE CONTROL SIGNAL; STRAL
(h) POSITION JUDGEMENT
(i) SEEK COMPLETE SIGNAL; SSKCP
T1
T21
T22
T23
T3
T4
T5
T6
T7
TLEAD
TTRAL
1st
2nd
3rd
NG IN THE SECOND POSITION JUDGEMENT

SERVO HEAD POSITIONER USING VCO AND COUNTER FOR DIGITIZING POSITION INFORMATION

BACKGROUND OF THE INVENTION

1. Field of Invention

The present invention relates to a servo control apparatus and more particularly to a servo control apparatus which realizes accurate positioning by a positioner in the servo drive system.

2. Description of the Prior Art

As an example of such a servo control apparatus, a known apparatus positions a head for magnetically recording information on the recording surface of magnetic disk and reproduces such recorded information from the recording surface of the magnetic disk, for example, as disclosed in U.S. Pat. No. 4,488,187 "Servo Control Apparatus". This apparatus generates, as a positioning means, a first pulse group and a second pulse group in order to read first servo data and second servo data and stores the respective pulse groups by individually counting them. However, such means for obtaining servo control data is complicated, and the structure of the apparatus becomes large in size and accordingly the apparatus itself becomes expensive.

Meanwhile, another known apparatus has the structure which compares servo information with a reference level. In this case, however, it is impossible to always execute accurate positioning of head because the reference level of such comparison means changes in accordance with temperature, etc.

SUMMARY OF THE INVENTION

In brief and in accordance with one aspect of the present invention, it is an object of the present invention to provide a servo control apparatus which has a simple structure and accurately controls a head.

The present invention is characterized in that a voltage controlled oscillator is controlled on the basis of servo information, an output signal of the oscillator is converted, as an amount of deviation, to a digital value relatively corresponding to an amount of position control using a reversible counter and thereby servo data can be obtained.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is, to be understood, that the drawings are for the purpose of illustration and description only and are not intended as a definition of the limits of the invention.

BRIEF DESCRIPTION OF THE DRAWINGS

FIGS. 2(*a*)–(*i*) illustrate the timing waveforms indicating respective signals in the embodiment of the present invention.

DESCRIPTION OF THE PREFERRED EMBODIMENTS

An embodiment of the present invention is explained in detail by referring to the accompanying drawings.

Figure 1:
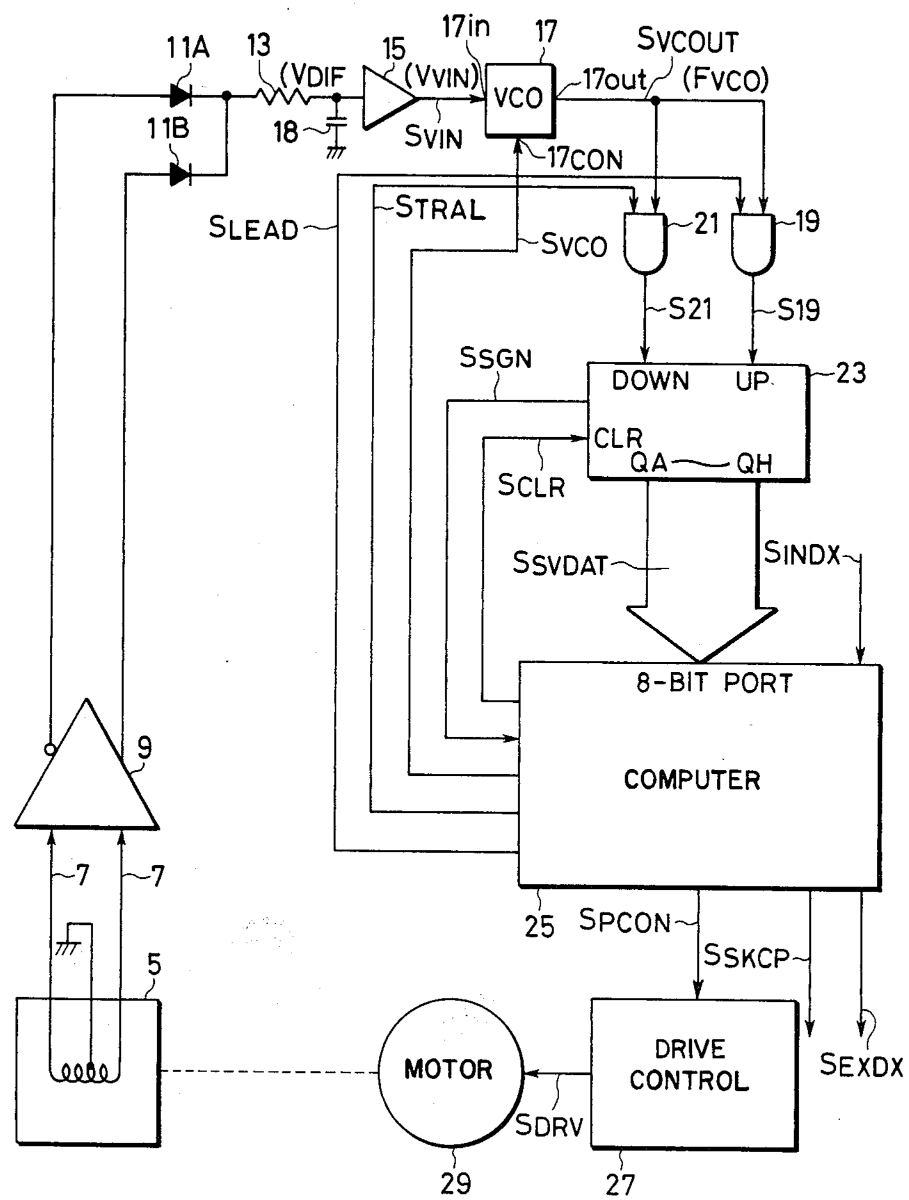
FIG. 1 is a block diagram indicating a structure of a servo control apparatus of an embodiment of the present invention.

FIG. 1 illustrates an embodiment of the present invention, wherein a position detection signal 7 sent from a magnetic head 5 is amplified by an amplifier 9 and is then supplied to the anode side of diodes 11A and 11B. The cathode side, of these diodes 11A, 11B is connected in common and is connected to the voltage control input terminal $17_{in}$ of a voltage controlled oscillator (hereinafter abbreviated as VCO) 17 through a resistor 13 and an amplifier 15. The input terminal of this amplifier 15 is grounded through a capacitor 18. An output terminal $17_{out}$ of VCO 17 is respectively connected to one end of each of AND gates 19 and 21. The output terminal of the one AND gate 19 and the output terminal of the other AND gate 21 are respectively connected to the addition input terminal UP and the subtraction input terminal DOWN of a reversible counter 23. The output signals QA–QH which indicate the counting condition of this reversible counter 23 are supplied, as 8-bit servo data signals S SVDAT, to the 8-bit input port of a microcomputer 25.

An addition/substraction code signal S SGN sent from the reversible counter 23 is introduced to the other input port of the microcomputer 25. An index of rotation signal SINDX is generated from for each rotation of a disk and sent to the microcomputer 25. Meanwhile, a position control signals S PCON, an external indes S EXDX, a seek complete signal S SKCP, a clear signal S CLR, an oscillation control signal S VCO, a front edge control signal S LEAD and a rear edge control, signal S TRAL are generated from the output port of microcomputer 25, as shown in FIG. 2. The position control signal S PCON is supplied to a stepping motor drive control circuit 27, while the clear signal S CLR to the clear input terminal CLR of the reversible counter 23, the oscillation control signal S VCO to the input terminal 17 CON for controlling oscillation start and stop of VCO 17, the front edge control signal S LEAD to the other end of the one AND gate 19, and the rear edge control signal S TRAL to the other end of the AND gate 21.

Figure 3:
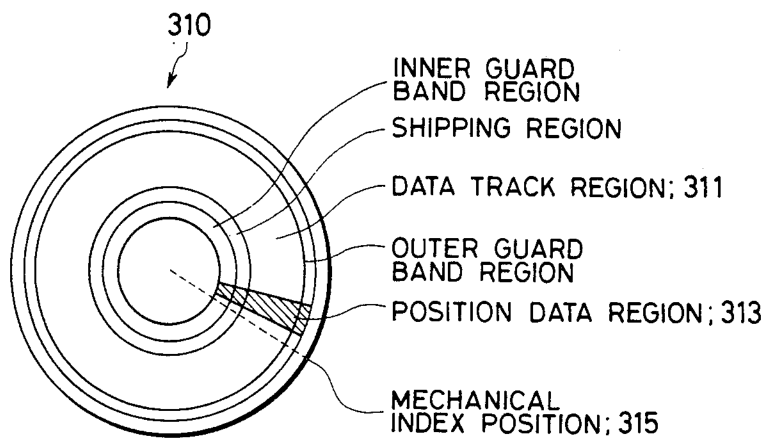
FIG. 3 is a structure indicating a data surface of a disk to which a magnetic head is positioned for position control in an embodiment of the present invention.

The index signal SINDX, which is generated from a spindle of a motor driving the disk, for example, goes "row" once each rotation at the mechanical index position 315, as shown in FIG. 3. In response, the microcomputer 25 produces the signals S CLR, S LEAD, and S TRAL in order to set the reversible counter to execute a programmed sequence.

The motor drive control signal S DRV generated from the stepping motor drive control circuit 27 is supplied to a stepping motor 29. This stepping motor 29 is provided with a magnetic head 5 with mechanical coupling means.

In the above structure, VCO 17 oscillates at a frequency F VCO proportional to a voltage $V_{in}$ of a voltage signal $S_{vin}$ supplied from the amplifier 15 to the voltage control input terminal $17_{in}$ and is used as a voltage-frequency converter. However, this oscillation is controlled for start and stop by the oscillation control signal S VCO supplied to the control input terminal 17 CON and the oscillation output signal S VCOUT of variable frequency F VCO is generated from the output terminal $17_{out}$ until the stop of oscillation. Here, the oscillation output signal S VCOUT is a pulse output signal which has a constant pulse duration and a repetition frequency F VCO which changes proportional to the voltage $V_{in}$.

The one AND gate 19 allows the oscillation output signal S VCOUT to pass only when the front edge control signal S LEAD is in the "LOW" logic level and supplies the addition input signal S19 generated from its output terminal to the addition input terminal UP of the counter 23. Moreover, the other AND gate 21 also supplies the subtraction input signal S21 to the subtraction input terminal DOWN of the reversible counter 23 only when the rear edge control signals S TRAL is in the "LOW" logic level. The reversible counter 23 executes counting for addition of each input pulse of the addition input signal S19 and also executes counting for subtraction of each input pulse of subtraction input signal S21. After such countings for addition and subtraction, the reversible counter 23 generates the addition/subtraction code signal S SGN which indicates the "POSITIVE" sign when the final counted value is "0" (initial value) or larger and the "NEGATIVE" sign when it is smaller than "0".

FIG. 3 indicates a data surface structure of a magnetic disk for explaining the positioning operation in the embodiment of the present invention.

The servo data for the positioning operation can be obtained by detecting displacement of the magnetic head 5 from a track location on the basis of buried servo information written in the position information region 313 as a part of each data track 311 in the magnetic disk 310. The positioning is carried out by sending the magnetic head 5 to the target track through employment of the micro step drive system where an amount of compensation is converted to a unbalance current for driving excitation phases A and B of the stepping motor 29.

Figure 4:
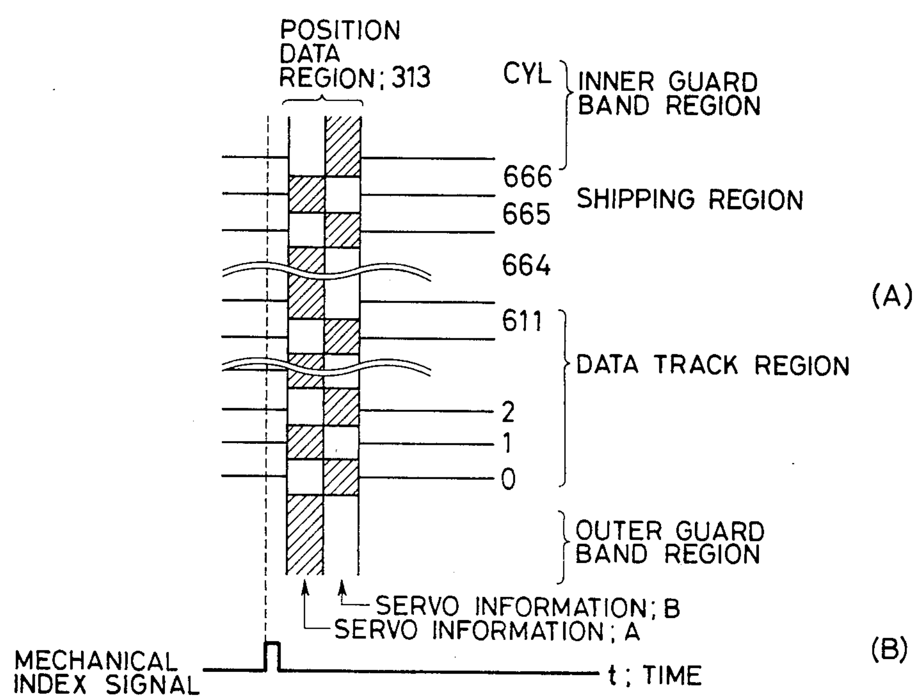
FIG. 4(A)–(B) shows the relation between a data track of the disk and buried servo information.

FIGS. 4(A)–(B) show the relation for obtaining servo data for the magnetic disk 310 which forms the structure of the data surface as shown in FIG. 3 in the embodiment apparatus of the present invention.

FIG. 4(A) indicates the relation between the data track region 311 and the position information region 313 to which the buried servo information is written. Here, the position information region 313 follows follows detection of the mechanical index position 315 with an index sensor (not illustrated). The servo information is previously written at the factory before shipment with reference to the mechanical index signal which is an output of such index sensor.

In the position information region 313, two patterns of magnetized inversion section and nonmagnetized inversion section (erasing section) are positioned alternately as the servo information shown in FIG. 4(A). The magnetized inversion section and non-magnetized inversion section in the circumferencial direction are arranged in two lines in the radius direction so that the boundary of said sections is located at the center of the data tracks. Two lines of servo information in the radius direction where the two patterns are arranged alternately are detected as servo information A and servo information B in the position information region 313 after the mechanical index position 315. The positional relation of the magnetic head 5 is indicated by the difference between the readout signals from the servo information A and B. When said magnetic head 5 is located at the center of the data track, the amplitude values of the readout signals of both servo information A and B are equal. If the magnetic head is deviated from the center of the data track, a difference is generated in the signal amplitude values of the readout signals of servo information A and B proportional to such deviation. The final compensation amount is obtained on the basis of the difference of signal amplitude values of servo information A and B, and an unbalance current corresponding to such compensation is supplied to the stepping motor 29. In this case, the stepping motor 29 is driven in microsteps so that the difference in amplitude values of servo information A, B are eliminated.

A detection signal 7 is generated from the magnetic head 5 based on the servo information A and servo information B and a DC voltage $V_{DIF}$ proportional to a signal amplitude value corresponding to deviation is generated at the input side of amplifier 15. This voltage $V_{DIF}$ is amplified by the amplifier 15 and is then supplied to VCO 17 as the signal S VIN of the voltage $V_{in}$.

Next, the total operation of this embodiment of the present invention is explained. In the following explanation, the "front edge zone" and "rear edge zone", respectively, correspond to the "servo information A" and "servo information B" described above.

First the internal seek complete signal S INSKCP shown in FIG. 2(*a*) becomes the "LOW" logical level at the timing T1 ("TRUE" condition). In other words, the S INSKCP signal becomes "LOW" when a prior seek operation is completed, and head position control can now be performed.

Thereafter, as shown in FIG. 2(*b*), the internal index signal S INDX becomes the "LOW" logical level at the timing T21. In this timing T21, the signal indicates a first index. When the internal index signal S INDX becomes the "LOW" logical level, the microcomputer 25 opens a "window". Namely, as shown in FIG. 2(*e*), the clear signal S CLR of negative pulse is supplied to the reversible counter 23 from the microcomputer 25 and thereby the counting condition of reversible counter 23 is cleared (initial value "0"). Therefore, the output signals QA and QH becomes all zero. Simultaneously, as shown in FIG. 2(*d*), the oscillation control signal S VCO is set to the "LOW" logical level. Thereby, VCO 17 is controlled to start oscillation and oscillates at the repetition frequency F VCO proportional to the input voltage $V_{in}$. Namely, the signal amplitude values corresponding to the servo information A and B detected by the magnetic head 5 is converted to pulse signals.

As explained above, VCO 17 generates the oscillation output signal S VCOUT of frequency F VCO, but since the front edge control signal S LEAD and rear edge control signal S TRAL output from the microcomputer 25 are in the "HIGH" logical level ("FALSE condition) at first, both AND gates 19 and 21 do not generate the output pulse signals.

Sequentially, as shown in FIG. 2(*f*), the front edge control signal S LEAD is set (at the timing T3) to the "LOW" logical level ("TRUE" condition) in accordance with the servo data of the front edge zone read by the magnetic head 5. Thereby, an addition input signal S 19 is output from the one AND gate 19 and the reversible counter 23 executes counting for addition for each output pulse. This counting operation for addition is continued until the timing T4 where the period T LEAD of the front edge window passes.

Moreover, when the magnetic head 5 reads the servo data of the rear edge zone, the microcomputer 25 returns to the "HIGH" logical level, as shown in FIG.

2(*g*), at the timing T6 where the rear edge window period T TRAL passes, setting (at the timing T5) the rear edge control signal S TRAL to the "LOW" logical level ("TRUE" condition). Thereafter, the pulse of the oscillation output signal S VCOUT passes the other AND gate for the rear edge window period T TRAL, generating the subtraction input signal S 21. Therefore, the reversible counter 23 executes counting for subtraction for each input pulse of subtraction input signal S 21.

Since a repetition frequency F VCO of the pulses counted for addition and subtraction during the aforementioned front edge window period T LEAD and rear edge window period T TRAL is proportional to a voltage ($V_{in}$) read out by the magnetic head 5, a counted value of reversible counter 23 becomes larger when the deviation of the magnetic head from the target track is larger.

Since the counting for subtraction is carried out during the latter rear edge window period T TRAL from the counted value CNTL at the timing when counting for addition during the former front edge window period T LEAD is completed, the counted value CNTT at the time of completion, the counted value CNTT at the time of completion T6 becomes a digital amount corresponding to the difference between the front edge zone and rear edge zone. Namely, the deviation amount from the track is relatively converted to digital information having a very high accuracy.

After the timing T6, the reversible counter 23 supplies the servo data signal S SVDAT which indicates an absolute value of counted value CNTT with 8 bits and an addition/subtraction code signal S SGN which indicates the sign (positive or negative) of counted value CNTT to the microcomputer 25. Here, the fact that information indicated by the addition/subtraction code signal S SGN is positive or negative means that deviation at the front edge zone is relatively larger or smaller than that in the rear edge zone.

Based on both signals S SVDAT and S SGN, the microcomputer 25 controls the stepping motor 29 so that the deviation is eliminated, i.e. the counted values become equal. Namely, the microcomputer 25 supplies a direction information which rotates the motor in the forward or backward direction in accordance with the positive or negative addition/subtraction code signal and a position control signal S PCON which indicates an absolute rotation amount indicated by the servo data signal S SVDAT to the stepping motor drive control circuit 27. According to this position control signal S PCON, a motor drive signal S DRV is generated, the stepping motor 29 is rotated, and the position control of magnetic head 5 is carried out. Therefore, positioning of the magnetic head 5 on the track for a single turn of disk 310 is carried out.

Since it is no longer necessary to cause VCO 17 to oscillate after the timing T6, the microcomputer 25 returns the oscillation control signal S VCO to the "HIGH" level (timing T7). Thereby, oscillation of VCO 17 stops. At the timing T7, the external index signal S EXDX is generated as shown in FIG. 2(*c*) and is supplied to an external computer to commence operations in the data region.

When the operations explained above is completed, the first servo operation for a single turn is completed. Thereafter a second servo operation after the timing T22 is started.

In the above embodiment, VCO 17 is used for the proportional conversion between voltage and frequency but it may be used in the relation of inverse proportional conversion. In the latter case, it is only a requirement that the absolute amount of rotation indicated by the position control signal S PCON is set in the inverse proportion to the servo data signal S SVDAT.

As the VCO 17, a device which can convert the data to a digital value is used. For example, a VCO which converts a voltage to a period or pulse width can be used. In such a case, the reversible counter 23 does not count the frequency but rather the time duration. Namely, the reversible counter 23 may be arranged to convert a duration into digital amounts.

As the counting sequence of reversible counter 23, it is not essential to first execute the counting for addition, and instead the counting for subtraction may be executed first. It is essential only that the final amount of compensation of head is obtained.

Moreover, the present invention is not limited only to positioning of the head for a magnetic disk. It can be adapted for positioning of a head for any information storing disk, for example, for an optical disk.

According to the above explanation, the present invention provides a servo control apparatus which has a simple structure and realizes position control of the head with high accuracy because an output signal corresponding to servo information is obtained with a voltage controlled oscillator, this output signal is converted to a digital value in accordance with the deviation by the reversible counter. Thereby servo data can be output in the form of a pulse signal and it is no longer necessary to provide a plurality of counters for counting such pulses.

Although particular embodiments of the present invention have been described and illustrated herein, it is recognized that modification and equivalents may readily occur to those skilled in the art. Consequently, it is intended that the claims may be interpreted to cover such modifications and equivalents and that the invention be limited only thereby.

What is claimed is:

1. A servo control apparatus for positioning a magnetic head on a target track on a recording surface of a magnetic disk rotated by a disk drive mechanism, wherein the disk drive mechanism includes means for providing a index signal indicating a predetermined index position of the disk on each rotation thereof, comprising:

said disk having stored on its recording surface in a servo region following said predetermined index position a first servo information followed by a second servo information for each track of the disk, wherein said magnetic head located near a track reads said first and second servo information successively and outputs first and second amplitude signals corresponding thereto, said servo region of the disk being followed by a data recording region of the disk;

a voltage controlled oscillator for receiving said first and second amplitude signals from said magnetic head and outputting first and second pulse signals corresponding thereto;

a first AND gate to which the output of said voltage controlled oscillator is provided as a first input and which provides said first pulse signal as an output upon application of a first timing signal as a second input to said first AND gate, and a second AND gate to which the output of said voltage controlled oscillator is provided as a first input and which provides said second pulse signal as an output upon application of a second timing signal as a second input to said second AND gate;

means including an UP and DOWN reversible counter for receiving the output of said first pulse signal from said first AND gate at an UP counting terminal and the output of said second pulse signal from said second AND gate at a DOWN terminal, for counting an amplitude quantity indicated in each of said first and second pulse signals in order to produce counted outputs in the form of respective first and second digital signals corresponding to said first and second pulse signals;

means including a microcomputer for comparing said first and second digital signals and deriving a difference signal indicating an amount of deviation of said magnetic head from precise positioning on the target track, wherein said microcomputer receives said index signal from said disk drive mechanism and outputs said first timing signal to said first AND gate and said second timing signal to said second AND gate in a programmed sequence in response thereto;

head positioning means including a drive system for receiving said difference signal and moving said magnetic head to a precise position on the target track such that said deviation amount is eliminated when said magnetic head is in the data recording region of the disk.

2. A servo control apparatus according to claim 1, wherein relative positioning of head for said disk is carried out by driving a micro stepping motor in accordance with the counted output of said reversible counter.

* * * * *